US011067124B2

United States Patent
Brown et al.

(10) Patent No.: US 11,067,124 B2
(45) Date of Patent: Jul. 20, 2021

(54) PLANAR ROTARY AIR BEARING STAGE

(71) Applicant: ALIO Industries, Inc., Arvada, CO (US)

(72) Inventors: Nathan Lyons Brown, Littleton, CO (US); Quinn Matthew Wolf, Arvada, CO (US)

(73) Assignee: ALIO Industries, Inc., Arvada, CO (US)

( * ) Notice: Subject to any disclaimer, the term of this patent is extended or adjusted under 35 U.S.C. 154(b) by 0 days.

(21) Appl. No.: 16/519,331

(22) Filed: Jul. 23, 2019

(65) Prior Publication Data

US 2020/0025248 A1 Jan. 23, 2020

Related U.S. Application Data

(60) Provisional application No. 62/701,900, filed on Jul. 23, 2018.

(51) Int. Cl.
*F16C 32/06* (2006.01)
*F16C 29/02* (2006.01)
(Continued)

(52) U.S. Cl.
CPC ........ *F16C 32/0614* (2013.01); *F16C 29/025* (2013.01); *F16C 32/0603* (2013.01);
(Continued)

(58) Field of Classification Search
CPC .......................... F16C 29/025; F16C 32/0614; F16C 32/0603; F16C 32/0688; F16C 32/0696;
(Continued)

(56) References Cited

U.S. PATENT DOCUMENTS

| 4,191,385 | A | * | 3/1980 | Fox | ........................ | F16C 29/025 |
| | | | | | | 277/432 |
| 6,019,515 | A | * | 2/2000 | Fujii | ................... | F16C 32/0696 |
| | | | | | | 384/107 |

(Continued)

FOREIGN PATENT DOCUMENTS

| CN | 102498236 A | * | 6/2012 | ............. | C23C 16/50 |
| CN | 104204573 A | * | 12/2014 | .......... | F16C 32/0622 |

(Continued)

*Primary Examiner* — Marcus Charles

(57) ABSTRACT

Various embodiments of the present technology generally relate to precise rotary motion control systems. More specifically, some embodiments relate to systems, methods, and means for providing pressure to a non-contact rotary system. In some embodiments, the rotary system comprises a rotary shaft that can rotate three hundred and sixty degrees continuously. In order for the rotary system to be entirely non-contact with any surfaces of surrounding components or housing, pressure must be supplied to a rotary air bearing that floats the rotary unit above a surface. In some examples, the bottom air bearing is a vacuum preloaded (VPL) air bearing. As such, the VPL air bearing requires a supply of positive pressure and a supply of negative pressure to stabilize the rotary unit. The present technology provides a mechanism for providing pneumatic air to the air bearing without a physical connection to the rotary shaft or air bearing.

20 Claims, 7 Drawing Sheets

(51) Int. Cl.
  *G01B 5/00* (2006.01)
  *F16C 41/00* (2006.01)
(52) U.S. Cl.
  CPC ........ *F16C 32/0696* (2013.01); *F16C 41/007* (2013.01); *F16C 2233/00* (2013.01); *F16C 2322/39* (2013.01); *G01B 5/0009* (2013.01)
(58) Field of Classification Search
  CPC ... F16C 41/007; F16C 2233/00; G01N 5/009; B23Q 1/38; B23Q 3/152; B23Q 3/154; B23Q 2220/002; B23Q 2220/004
  USPC .... 384/26, 93, 100, 107.114, 121, 129, 134, 384/901
  See application file for complete search history.

(56) References Cited

U.S. PATENT DOCUMENTS

| | | | | |
|---|---|---|---|---|
| 6,443,618 | B1 * | 9/2002 | Nishikawa | F16C 29/025 277/351 |
| 7,603,785 | B2 * | 10/2009 | Kosmowski | B23K 26/0876 33/286 |
| 2001/0014281 | A1 * | 8/2001 | Uesugi | F01D 15/06 415/111 |
| 2008/0198485 | A1 * | 8/2008 | Kosmowski | F16C 29/008 359/811 |
| 2008/0229811 | A1 * | 9/2008 | Zhao | F16C 29/025 73/104 |
| 2010/0094587 | A1 * | 4/2010 | Mysore, V | G01B 5/008 702/155 |
| 2013/0188895 | A1 * | 7/2013 | Devitt | F16J 15/342 384/121 |
| 2015/0160354 | A1 * | 6/2015 | Mertens | G01N 23/046 378/9 |

FOREIGN PATENT DOCUMENTS

| | | | | |
|---|---|---|---|---|
| CN | 108489836 A | * | 9/2018 | ............... G01N 3/44 |
| WO | WO-2007016689 A1 | * | 2/2007 | ......... C03C 23/0075 |
| WO | WO-2013046793 A1 | * | 4/2013 | .......... F16C 32/0614 |
| WO | WO-2013105333 A1 | * | 7/2013 | ............... F16C 29/12 |
| WO | WQ-2014024666 A1 | * | 2/2014 | .......... F16C 32/0622 |
| WO | WO-2015043228 A1 | * | 4/2015 | ............ B23Q 16/102 |

* cited by examiner

PLANAR ROTARY AIR BEARING STAGE

CROSS REFERENCE TO RELATED APPLICATIONS

This application claims priority to and benefit from U.S. Provisional Patent Application Ser. No. 62/701,900, filed on Jul. 23, 2018, by the same title, which is expressly incorporated by reference herein.

TECHNICAL FIELD

Various embodiments of the present technology generally relate to systems, methods, and means for providing pressure to a rotary stage without a physical connection to the rotary stage. More specifically some embodiments relate to a low-friction rotary motion platform, wherein the rotary motion platform requires at least one pressure be supplied to the rotary motion platform without contact.

BACKGROUND

Rotary stage systems are utilized for precision motion in angular and linear directions and are commonly used in manufacturing processes, measurement processes, and similar motion processes that require precise movement. Motion systems are mechanical systems that are used to hold and position a part, such as in manufacturing, machining, industrial processes, or part analysis, for example. Motion systems used to position a part typically require a high degree of accuracy in order to achieve a highly precise positioning of the part. In order to achieve a large number of working positions, a motion system may employ multiple actuators, motors, and other devices coupled together to position a platform or system on which a part or workpiece is mounted. Complicated systems lead to additive tolerances and therefore reduce positional accuracy. Furthermore, complicated interactions between components can lead to poor stability within the system.

A drawback of existing motion systems with a large number of actuators, motors, and other motion devices is the inability to provide a high level of positional accuracy due to an accumulation of error tolerances. The result of this drawback is complicated motion systems that cannot provide a high level of positional accuracy. Prior art motion systems may provide micron order performance, at best, due to additive tolerance errors from multiple moving hardware axes.

Friction may be an additional source of error tolerance in many systems. Systems have trended towards reducing error via low-friction or non-contact systems. Air bearings are sometimes used and utilize a thin film of pressurized gas to create an interface between two surfaces. By reducing the number of components that touch in a system, many traditional bearing-related errors from sources such as friction, wear, heat, backlash, and lubricant handling are reduced or eliminated.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments herein relate to systems, methods, and means for providing pressure to a non-contact rotary system. In some embodiments, the rotary system comprises a rotary shaft that can rotate three hundred and sixty degrees continuously. That is, the rotary shaft is not limited by a number of times it can make a full rotation because it does not require connective components for supplying pneumatic air. In order for the rotary system to be entirely non-contact with any surfaces of surrounding components or housing, pressure must be supplied to a bottom air bearing, floating the rotary shaft above a surface. In some examples, the bottom air bearing is a vacuum preloaded (VPL) air bearing. As such, the VPL air bearing requires a supply of positive pressure to hover the air bearing above the surface in addition to a supply of vacuum pressure to hold the air bearing down. The opposing forces on the VPL air bearing due to the positive and negative pressures create vertical stability without friction between any surfaces.

In some embodiments, a rotary stage comprises a base and a housing. An exemplary embodiment of a base may be a granite block. The housing comprises at least one air bearing that maintains x and y stability of a rotary shaft comprising a VPL air bearing that sits directly above the base. The housing further comprises at least one air bushing. The air bushing is a cylindrical air bearing that fits around the circumference of the rotary shaft. In the present example, the air bushing is mounted to the housing and fit to the rotary shaft. The air bushing is mounted to the housing such that the housing does not constrain the motion of the air bushing or the rotary shaft in the x-y plane. The x and y motion of the rotary shaft is intended to be solely constrained radially by the at least one air bearing. In order to provide a positive pressure to the VPL air bearing, the air bushing has a first port that provides a positive pressure to a first aperture of the rotary shaft. The first aperture supplies pressure to the VPL air bearing. The positive pressure supplied by the first aperture is used by the VPL air bearing to float the rotary shaft above the base. The air bushing further comprises a second port that provides a negative (i.e., vacuum) pressure to a second aperture of the rotary shaft. The second aperture supplies the vacuum to the VPL air bearing. The vacuum pressure creates a vacuum between the VPL air bearing and the base, stabilizing the rotary shaft directly above the base.

The rotary shaft can rotate about a z-axis, where the z-axis is a vertical axis up the center of the rotary shaft. The rotary shaft and the VPL air bearing can rotate three hundred and sixty degrees continuously and are non-contact with any other components. In the present example "continuously" means that once the rotary shaft and VPL air bearing reach three hundred and sixty degrees, or a full rotation, it can continue to rotate in the same direction. The term continuously in the present example is not intended to limit the technology to continuously rotate in time. However, the present technology enables frictionless, non-contact, three hundred and sixty degree continuous rotation by not requiring the positive and negative pressures be supplied through a mechanical seal by a direct connection with the rotary shaft using a physical connection such as tubing, hosing, mechanical seals, a conventional rotary union, or any other link to supply the positive and negative pressures.

In some examples, the rotary shaft comprises a groove around its circumference at the height of each of the apertures and each of the grooves comprises an aperture. Furthermore, in certain examples, the rotary shaft comprises a grated ring that an optical encoder coupled to the housing can read to determine an angular position of the rotary components. In yet another example, the air bushing comprises a third port that provides a pressure to a third aperture of the rotary shaft and the third aperture provides the pressure to a top of the rotary shaft. Furthermore, the housing may comprise at least one additional air bearing for translation of the housing in the x direction and the y direction in the x-y plane.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several implementations are described in connection with these drawings, the disclosure is not limited to the implementations disclosed herein. On the contrary, the intent is to cover all alternatives, modifications, and equivalents.

DETAILED DESCRIPTION

Figure 1:
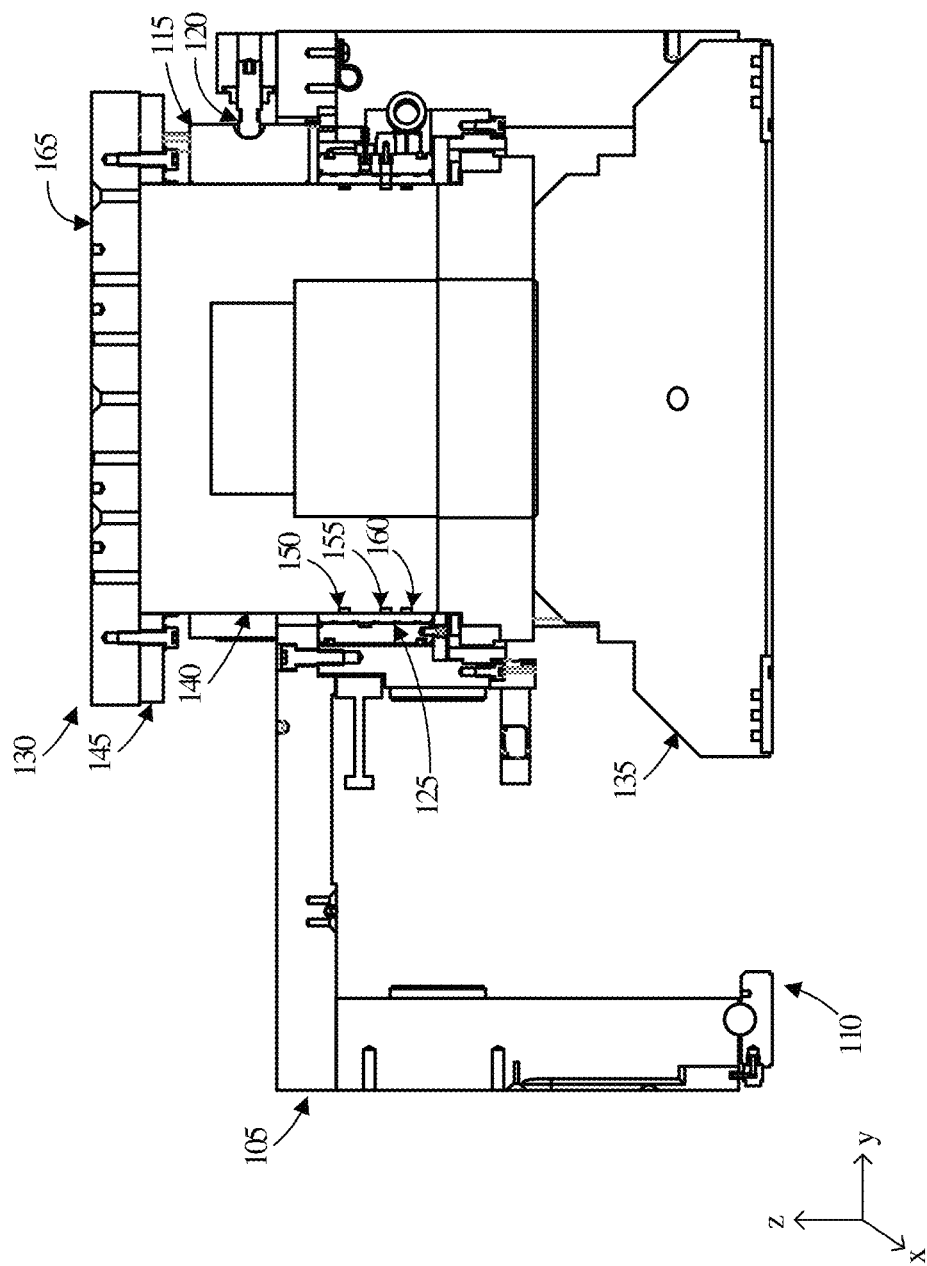
FIG. 1 illustrates an exemplary embodiment of a rotary stage in accordance with some embodiments of the present invention.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

The embodiments described herein are not limited in their application to the details of construction, arrangement of components, or illustrations in the following drawings. Embodiments may be practiced or carried out in various ways. Additionally, the phraseology and terminology used herein is for the purpose of description and should not be regarded as limiting. The use of "including." "comprising," or "having" and variations thereof is meant to encompass the items listed thereafter and equivalents thereof as well as additional items. The terms "vertical plane," "vertical axis," "z axis," and equivalents thereof may be used interchangeably and are herein considered to generally refer to the vertical direction in reference to the present technology. Similarly, "x-y plane" "x and y," "x, y," "horizontal plane," and equivalents thereof may be used interchangeably and are herein considered to generally refer to the horizontal directions. Furthermore, the term "air bearing" generally refers to bearings that utilize a thin layer of pressurized gas to create a low friction interface between surfaces. Air bearings may be utilized in several different forms in the present invention and the general term is not to be limited to a specific shape or embodiment.

Modern motion system technology including coordinate-measuring machines (CMMs) require increasingly high precision with increasingly smaller tolerances. In order to accommodate these demanding requirements, motion control systems must reduce errors wherever possible. Friction can be a significant source of error and imprecision. Thus, motion control systems may require as much reduction of friction in the system as possible. Complicated systems with multiple actuators, motors, and other moving parts can lead to additive tolerances further reducing positional accuracy. Therefore, a non-contact rotary stage can reduce frictional errors with the use of air bearings to avoid contact on any surfaces. However, for a rotary stage to be entirely non-contact with a three hundred and sixty degree continuous rotation, a pneumatic system supplying pressurized gas to the bearings is required. Direct connections such as tubes, pipes, O-ring rotary unions, and other connections prohibit a rotary platform from being non-contact and inhibit the ability to rotate freely and continuously. Thus, a non-contact, frictionless rotary union capable of receiving pressurized air or vacuum implemented within a high-precision rotary stage is disclosed herein.

Various embodiments of the present technology generally relate to systems, methods, and means for providing pressure to a rotary stage without a physical connection to the rotary stage. More specifically some embodiments relate to a low-friction rotary motion platform, wherein the rotary motion platform requires at least one pressure be supplied to the rotary motion platform without contact. In some examples, the present invention is a rotary stage comprising a base, a housing, and a rotary shaft. The housing comprises a set of air bearings that maintains stability of the rotary shaft in an x-direction and a y-direction in an x-y plane. The housing may additionally include at least one air bearing for translation of the housing, and therefore the rotary shaft, in the x direction and the y direction in the x-y plane. In some examples the rotary shaft comprises a rotary air bearing, while in other embodiments the rotary shaft and rotary air bearing may be separate components coupled together. The rotary air bearing may be a vacuum preloaded (VPL) air bearing located directly above the base of the rotary stage. The housing also includes an air bushing having a first port that provides a positive pressure to a first aperture of the rotary shaft and a second port that provides a negative pressure to a second aperture of the rotary shaft.

The positive pressure in the present example is provided to the VPL air bearing through the first aperture of the rotary shaft and floats the rotary shaft above the base. The negative pressure is provided to the VPL air bearing through the second aperture of the rotary shaft and holds the rotary shaft down to the base. The opposing forces generated by the negative pressure and the positive pressure between the VPL air bearing and the base vertically stabilize the rotary shaft, constraining its movement along the z-axis, where the z-axis is the vertical axis normal to the x-y plane.

In some examples, the first aperture of the rotary shaft is located within a first groove of the rotary shaft and the second aperture is located within a second groove. The present technology supplies various pressures to the rotary shaft without contact via the air bushing. The air bushing provides a pressure to the space made by a groove, where an aperture is located within the groove. The non-port surfaces of the air bearing provide a constant supply of air that create an air barrier for the pressure to travel through without escaping. The grooves therefore provide space for the pressure to exist between the air bushing and the rotary shaft. Thus, a path of pressure can be supplied to the aperture no matter what degree of rotation the rotary shaft is at in relation to the port on the air bushing in the housing.

In the present example, the rotary shaft and the VPL air bearing can rotate three hundred and sixty degrees continuously. The term "continuously" is intended to mean they can continue to rotate past three hundred and sixty degrees infinitely many times, not that they constantly rotate. On the contrary, the rotary shaft could also rotate for a continuous period of time. Because the rotary shaft can rotate continuously, the present example includes an encoder feedback ring on the rotary shaft or air bearing that can be read by an optical encoder coupled to the housing. Thus, the optical encoder can be aware of the angular position of the rotary shaft at any time.

In some examples, the air bushing may comprise a third port that provides a pressure to a third aperture of the rotary shaft. The third aperture may provide the pressure to the top surface of the rotary shaft, according to the needs of a user.

In another embodiment, a system for non-contact rotary motion comprises a rotary air bearing that rotates about a vertical axis and a non-rotary air bearing. The rotary air bearing comprises a first aperture that receives a first pressure and a second aperture that receives a second pressure. The non-rotary air bearing comprises a first port that provides the first pressure to the first aperture of the rotary air bearing and a second port that provides the second pressure to the second aperture of the rotary air bearing.

In an additional example, a method of supplying pressure to a rotary unit is provided. The method comprises maintaining horizontal stability of a rotational air bearing, providing a first pressure to a first aperture of the rotational air bearing without a physical connection between the air bushing and the rotational air bearing, and providing a second pressure to a second aperture of the rotational air bearing without a physical connection between the air bushing and the rotational air bearing.

In yet another embodiment, a system for providing pressure to a non-contact rotary unit includes a means for providing a positive pressure to a first aperture of the rotary unit without contacting the rotary unit and a means for providing a vacuum pressure to a second aperture of the rotary unit without contacting the rotary unit. The present example also includes a means for maintaining a horizontal stability of the rotary unit without contacting the rotary unit and a means for maintaining a vertical stability of the rotary unit without contacting the rotary unit.

FIG. 1 demonstrates an exemplary embodiment of a rotary stage in accordance with the present technology. In some examples, the rotary stage of FIG. 1 is located within a CMM, or a similar rotary motion system. FIG. 1 includes housing 105, where housing 105 includes air bearing 110, radial air bearing 115 mounted on joint 120, and air bushing 125. Within housing 105 is rotary shaft 130, which comprises VPL air bearing 135, shaft cylinder 140, encoder feedback ring 145, groove 150, groove 155, groove 160, and mounting surface 165. Shaft cylinder 140 and VPL air bearing 135 are coupled to one another in the present example and can rotate non-contact with any components of housing 105. Rotary shaft 130 rotates about a theoretical z-axis that runs vertically through the coaxial centers of shaft cylinder 140 and VPL air bearing 135 and is normal to a base of the housing that VPL air bearing 135 is held directly above. The base may be any bottom surface that the VPL air bearing is held directly above.

In the present example, rotary shaft 130 comprises a large diameter air bearing, VPL air bearing 135 that rides on the base. The base may be a bottom surface made of granite, in some examples. The VPL air bearing vertically supports the rotating mass of the rotary shaft and any payload mass that may be mounted on mounting surface 165. VPL air bearing 135 uses a positive pressure to float itself on the base. The air bearing of the rotary shaft allows the rotary shaft to rotate without constraining the rotary shaft's z-axis in any horizontal direction. Thus, rotary shaft 130 can move laterally in an x-direction and a y-direction of an x-y plane parallel to the base. VPL air bearing 135 also has a vacuum applied to it to hold it down to the base. In the present example, an inner diameter of the base of VPL air bearing 135 is hollowed out such that enough room is provided to create a sufficient vacuum space to hold down rotary shaft 130.

In some cases, a positive pressure air bearing may be used in the place of VPL air bearing 135. The positive pressure air bearing may use only a single pressure source, without a vacuum pressure supply and without a vacuum chamber to hold the air bearing down to the base. Alternatively, two sources of positive pressure may be supplied to VPL air bearing 135, wherein the second positive pressure is used in a vacuum generator located within the rotary shaft. The vacuum generator may then use the second positive pressure to generate vacuum in the rotary shaft.

Rotary shaft 130 further comprises shaft cylinder 140. Shaft cylinder 140 is a steel shaft cylinder in the present example, where the steel shaft cylinder is a stainless-steel cylinder with modifications according to the needs of the present technology. Rotary shaft 130 also includes a motor rotor assembly. In the present example, the motor rotor assembly comprises a magnetic ring that is permanently fixed to the shaft. The motor rotor assembly, however, could be any motor capable of rotating the rotary shaft, including a frameless torque motor magnetic ring.

Rotary shaft 130 includes a high-accuracy encoder feedback ring 145, in the present example. Encoder feedback ring 145 is coupled to the outer diameter of rotary shaft 130 and has grating around the outer diameter of the ring. In some examples, encoder feedback ring 145 is permanently fixed to the rotary shaft, but may be removable, movable, or the like in other examples. In the present example, encoder feedback ring 145 is a ground disk encoder ring that can be mounted flat and mechanically adjusted to be within less than 10 micrometers of coaxial to rotary shaft 130. However, encoder feedback ring could be any rotary encoder feedback product that is non-contact with the encoder.

Housing 105 is a non-rotary housing that includes a motor stator, an encoder system, a set of kinematically mounted radial air bearings, a set of translational air bearings, and air bushing 125. In some cases, air bushing 125 is mounted to housing 105 via a set of O-rings. The O-rings couple air bushing 125 to housing 105, helping position air bushing 125. However, the O-rings enable flexibility in that they can be compressed, allowing air bushing 125 to float slightly laterally, ensuring no resistance against the radial constraint provided by the radial air bearings. The motor stator is an electric coil wound to interface with the magnetic ring of rotary shaft 130. The motor stator is a part of the frameless torque motor that enables rotary shaft 130 to rotate. In the present example, the frameless torque motor specifically uses ironless coils to eliminate radial forces between rotary shaft 130 and the non-rotating electric coil.

A typical motor can have cyclical radial forces associated with the magnetic pattern on the rotor. These cyclical forces acting on the bearing add to runout error and greater precision degradation of the rotation. The motor of the present example is frameless alternating current (AC) servo torque motor that is designed to minimize radial forces in order to minimize the degradation of the rotational precision, including effects such as runout and wobble. However, other motor designs that have similar levels of precision are anticipated. The rotary stage itself can be run by many types of controllers and amplifiers, but control systems that enable high precision and high constant velocity performance are preferred to maintain a precise system. The encoder system utilizes encoder feedback ring 145 to determine an angular position of rotary shaft 130. The encoder system reads the grating on the encoder ring. In some examples, the encoder system may comprise only one encoder head. In other examples, more than one encoder head may be used, such as a dual-head encoder system where the signals are averaged to remove eccentricity from the angular position data.

Housing 105 comprises three kinematically mounted radial air bearings, including radial air bearing 115, that are non-rotating and coupled to the housing. In other examples, housing 105 may comprise a different number of radial air bearings providing horizontal stability to the rotary shaft. The air bearings of the present example are mounted on ball and socket joints, such as joint 120. The ball and socket joints allow each of the radial air bearings to self-align and mate with the outer diameter of rotary shaft 130. All three radial air bearings may be preloaded to a kinematic arrangement constraining rotary shaft 130 in the x and y directions relative to the housing. In the present example, a four to ten micrometer air gap exists between each of the radial air bearings and rotary shaft 130. The air gap allows rotary shaft 130 to rotate on high pressure air between the air bearings and the rotary shaft. Because the three air bearings are kinematically mounted, they define the location of the z-axis, as three points acting radially constrain the round cylinder to be stationary in x and y. Thus, when housing 105 moves in x and y, rotary shaft 130 precisely follows the housing in the x and y plane.

Housing 105 may move in x and y on a combination of mechanical and air bearings that translate housing 105 precisely in the x-y plane, where the translation is enabled by set of air bearings including air bearing 110. Air bearing 110 vertically holds the housing down to a base, assisting in precise translation of the housing. The translational air bearings allow low-friction translation of housing 105 and rotary shaft 130 in the x and y plane. For example, if housing 105 is used in a CMM, the job may require both translational and angular positioning of a part on mounting surface 165 in order to properly measure and analyze the part.

Air bushing 125 is a hollow, cylindrical air bearing that is coupled to housing 105 and fits around rotary shaft 130. Air bushing 125 acts as a frictionless rotary union to feed high pressure air to VPL air bearing 135. Rotary shaft 130 requires a pneumatic system that provides high pressure air supplied to it such that VPL air bearing 135 riding on the base can be pressurized. Thus, air bushing 125 supplies the pressurized air to rotary shaft 130 and subsequently to VPL air bearing 135. Air bushing 125 has multiple pressurized surfaces that are composed of a porous media. Because of the porous media of these surfaces, they can supply a limited amount of pressure and act as flow restrictors. Rotary shaft 130 has grooves (groove 150, groove 155, and groove 160) that are not pressured and line up with corresponding ports of air bushing 125. The ports of air bushing 125 can be pressurized and supply the pressure to the corresponding grooves in rotary shaft 130. In order for each of the ports to supply pressure to the corresponding groove and the corresponding aperture of rotary shaft 130, the adjacent air bearing surfaces act as a seal to each pressure supplied by the ports. Thus, the adjacent air bearing surfaces seal and restrict flow, limiting the escape of the pressure.

By restricting the escape of pressure, a first pressure can be supplied from a first port of air bushing 125 into a first groove and into a first aperture of rotary shaft 130, where the first aperture is a cross-drilled hole that has an opening in the first groove and supplies the first pressure to VPL air bearing 135. For example, the first pressure may be the positive pressure required to float rotary shaft 130 off the base. In a similar manner, additional grooves in rotary shaft 130 can feed in vacuum to VPL air bearing 135. Due to the pressure supplied by the air bushing, there is high pressure adjacent to the grooves of rotary shaft 130. However, because the high-pressure source is limited in flow, if there is enough evacuation flow from the vacuum pump, the pressure leakage can be exhausted, creating a net vacuum (relative to atmosphere) in the groove and port. Thus, the vacuum pressure can be ported to the vacuum supply necessary for the VPL air bearing. Thus, a second pressure may be supplied through a second port of air bushing 125 into a second groove and thus into a second aperture of rotary shaft 130, where the second pressure is the negative (vacuum) pressure required by VPL air bearing 135 to hold rotary shaft 130 down to the base.

In some scenarios, additional ports supply pressure to additional apertures of rotary shaft 130, which may then be supplied to components of rotary shaft 130 according to the needs of a specific application. In some examples, a third port of air bushing 125 supplies a third pressure to a third groove of rotary shaft 130, and a third aperture provides the pressure to mounting surface 165. Some scenarios may require that vacuum is ported to the mounting surface of the rotary shaft to act as a vacuum supply for any rotating device, vacuum chuck, or the like that a user may require from the system.

Air bushing 125 is mounted to housing 105 such that it has some radial compliance in regards to its mounting. In this way, air bushing 125 does not over constrain the rotational axis and the rotational axis is defined purely by the three kinematically mounted radial air bearings. Air bushing 125 should not provide any x, y constraint and is able to move slightly in x and y within the housing such that it can self-align to the axis location, coaxial with rotary shaft 130.

The system of the present rotary stage example provides for an exceptionally high level of precision. Precision and accuracy of a rotary stage are achieved at least partially through angular accuracy, the mitigation of runout, and the mitigation of wobble. These features are achieved, in the present technology, primarily using precise components including the rotary shaft, VPL land surface, and base and secondarily using precise dual encoder heads, ironless stator, and large diameter VPL air bearing. Furthermore, the strategic placement of components relative to one another and precise mounting mechanisms and housings are also integral to building a precise system.

In some examples, the rotary stage of FIG. 1 is located within a CMM, or a similar rotary motion system. In an exemplary embodiment of the present invention, a preferred order of components of the rotary stage from the bottom up is: rotary air bearing, motor, air bushing, radial air bearings, encoder, and customer mounting surface. By having the encoder near the top of the rotary shaft and the radial air bearings just below the encoder, optimal angular positioning accuracy and runout performance is achieved. The order provided lends to optimum performance in the present example, but other arrangements may be used and are anticipated.

Figure 2:
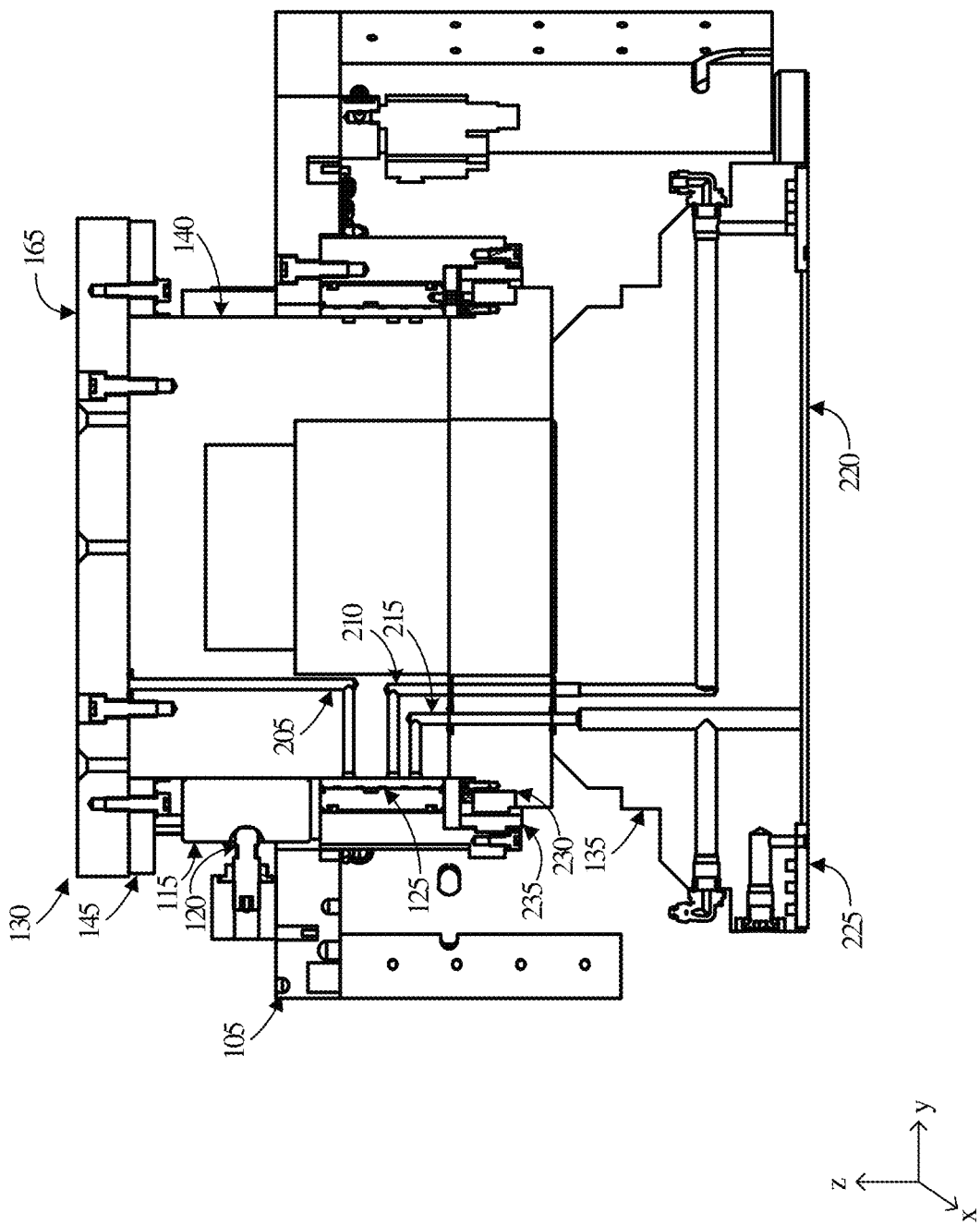
FIG. 2 illustrates an exemplary embodiment of a rotary stage in accordance with some embodiments of the present invention.

FIG. 2 demonstrates a rotary stage including apertures for providing pressure to the rotary shaft in accordance with certain embodiments of the present invention. The rotary stage of FIG. 2 comprises housing 105, radial air bearing 115, joint 120, air bushing 125, rotary shaft 130, rotary air bearing 135, shaft cylinder 140, encoder feedback ring 145, mounting surface 165, aperture 205, aperture 210, aperture 215, vacuum area 220, air bearing land 225, motor rotor 230, and motor stator 235. Air bushing 125 supplies pressure to apertures 205, 210, and 215.

As previously discussed, air bushing 125 comprises three ports in the present example. A first port feeds a first pressure to aperture 205 and aperture 205 provides the pressure to mounting surface 165. According to the present technology, the first port of air bushing 125 and aperture 205 are optional and may be based on the needs of a user. In some scenarios, a user may require a vacuum supply to mounting surface 165. In the present example, air bushing 125 comprises a second port that feeds a second pressure to aperture 210. In the present example, the second port of air bushing 125 supplies a positive pressure and aperture 210 provides the positive pressure to air bearing land 225 of VPL air bearing 135. Air bearing land 225 then uses the positive pressure to float on an air gap above a base or bottom surface at a fly height. In this manner, VPL air bearing 135 can rotate without friction between it and the base or bottom surface. VPL air bearing 135, in some examples, is rotated by an electric torque motor. The electric torque motor includes motor rotor 230 (i.e., magnetic ring) and motor stator 235. In the present example, the frameless torque motor specifically uses ironless coils to eliminate radial forces between rotary shaft 130 and the non-rotating electric coil.

Air bushing 125 also includes a third port that supplies a third pressure to aperture 215. In the present example the third pressure is a negative (vacuum) pressure. In FIG. 2, aperture 215 supplies the vacuum pressure to vacuum area 220 of VPL air bearing 135. The vacuum pressure is then used by VPL air bearing to create a vacuum in vacuum area 220 in order to maintain vertical stability of VPL air bearing 135 as it floats on the air gap between it and the base or the surface below. By supplying both a positive pressure for the air bearing and a vacuum pressure, the fly height and air gap stiffness can be precisely controlled. The precise control over the vertical position of rotary shaft 130 is an important component of a low-friction rotary stage capable of meeting tolerance needs of modern motion system technology.

Figure 3:
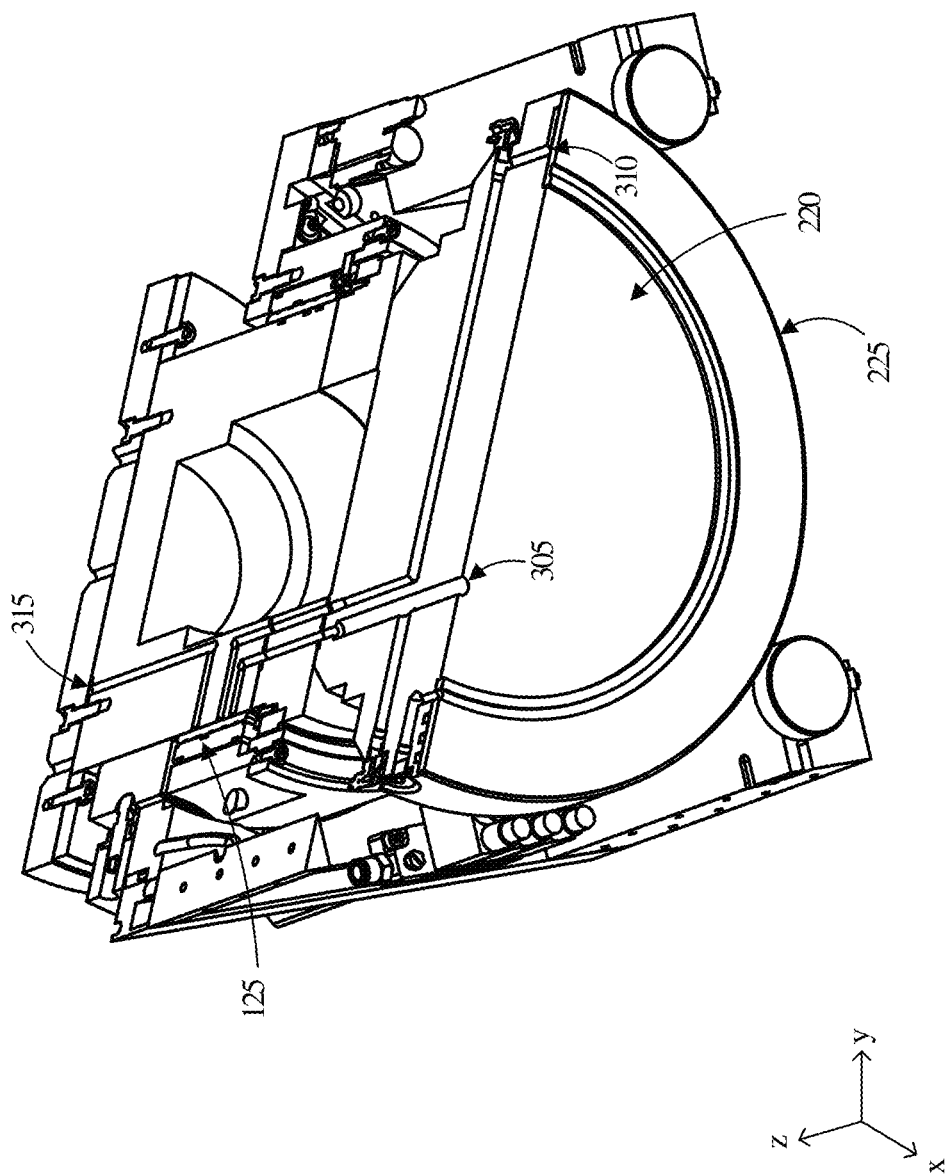
FIG. 3 illustrates an exemplary embodiment of a rotary stage in accordance with some embodiments of the present invention.

FIG. 3 provides further detail related to the delivery of pressure to the rotary shaft of FIG. 2. FIG. 3 comprises air bushing 125, vacuum area 220, air bearing land 225, as well as aperture exit 305, aperture exit 310, and aperture exit 315. As previously described, a port of air bushing 125 provides a vacuum pressure to a hole of a rotary unit. The vacuum pressure is then provided to a vacuum area via cross-drilled holes within the rotary unit. The aperture meets vacuum area 220 at aperture exit 305. Via aperture exit 305, pressure can be evacuated from vacuum area 220 to create sufficient force to hold the rotary unit at a controlled fly height. Similarly, an additional port of air bushing 125 supplies a positive pressure to an additional hole of the rotary unit. The rotary unit includes a second set of cross-drilled holes through which the pressure is supplied to air bearing land 225. The positive pressure reaches air bearing land 225 via aperture exit 310.

The forces created at the base of the VPL air bearing in the present example provide a means to precisely control the size of an air gap that exists between a base and the VPL air bearing. In some examples, the base is a granite base. By maintaining precise control over the size of the air gap, the rotary unit can precisely rotate thus providing precise positioning for a component mounted on the rotary stage. Furthermore, by eliminating friction due to contact between a rotary bearing and a base, precision can be better maintained.

Due to the porous nature of air bearing land 225, there is limited flow through the air gap. The vacuum preloaded air bearing uses this to the advantage; with enough evacuation flow being drawn from vacuum area 220 via aperture exit 305, the pressure leakage can be exhausted to create a net vacuum in the vacuum area, aperture, and port. Thus, the vacuum is ported to the vacuum supply necessary for the rotary air bearing.

Figure 4:
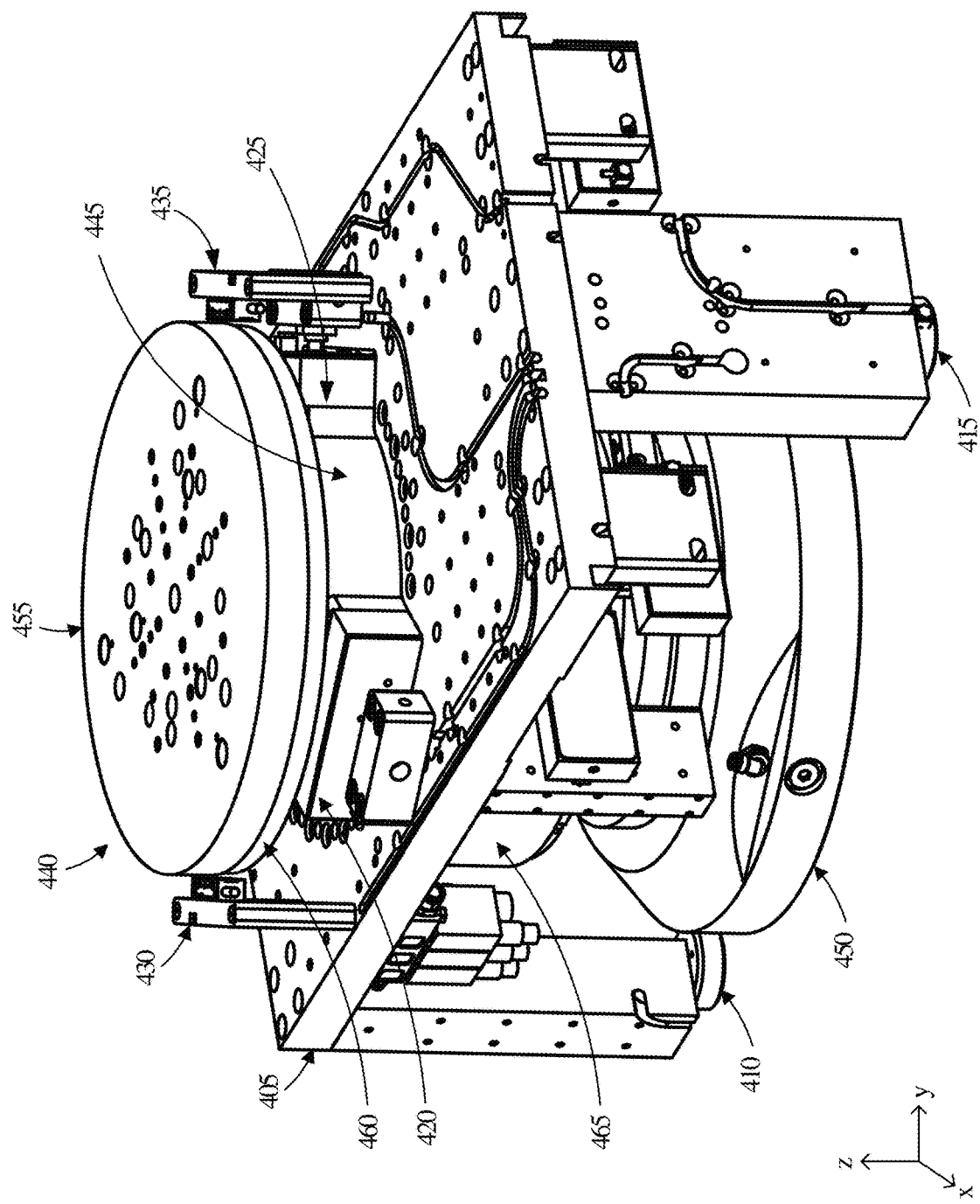
FIG. 4 illustrates an exemplary embodiment of a rotary stage in accordance with some embodiments of the present invention.

FIG. 4 illustrates an additional example of a rotary stage in accordance with the present technology. The rotary stage of FIG. 4 includes translational frame 405 and rotational unit 440. Translational frame 405 includes air bearing 410, air bearing 415, radial air bearing 420, radial air bearing 425, encoder head 430, encoder head 435, and air bushing 465. Rotational unit 440 includes rotational cylinder 445, rotational air bearing 450, mounting plate 455, and encoder ring 460. The rotary stage of FIG. 4 may be implemented in a variety of motion control systems. Mounting plate 455 can be set up in a variety of ways such that it can be used to control motion and position for a wide variety of applications. In some examples, a part is mounted to mounting plate 455 using, at least in part, vacuum supplied by air bushing 465 for any rotating device or vacuum chuck that may be required in a system.

Translational frame 405, in the present example, includes three air bearings, such as air bearing 410 and air bearing 415, that allow for precise translational movement in the x, y plane of the rotary stage. Translational frame 405 may take on other embodiments as well, such as including non-air bearings for translational movement. However, in the present example, air bearings are used for translational frame 405 because of the limited friction created between them and a surface on which the stage may translate. Because of the precise rotational movement allowed by the low-friction rotational unit, it may be advantageous to include low-friction translation equipment as well, such as air bearings 410 and 415.

The translational frame of the present example includes three radial air bearings, including radial air bearing 420 and radial air bearing 425. Each of the three radial air bearings are kinematically mounted, non-rotating, and fixed to the translational frame. The three radial air bearings are each mounted on a ball and socket joint that allow them to self-align and mate with the outer diameter of rotational unit 440. The three radial air bearings horizontally constrain rotational unit 440, defining a center axis, or z-axis, of the rotary unit. An air gap between rotational unit 440 and each of the radial air bearings allow rotational unit 440 to rotate on the high-pressure air. In this way, when translational frame 405 moves in the x, y plane, rotational unit 440 follows it precisely in the x, y plane.

Translational frame 405 also includes an encoder system that reads encoder ring 460 in order to determine the rotational position of rotational unit 440. The encoder system utilizes two encoder heads, encoder head 430 and encoder head 435, to determine a precise position of rotational unit 440. The dual-head encoder system averages the signal of each encoder head to remove eccentricity from the rotational position data. Each of encoder heads 430 and 435 is lined up to and nearby encoder ring 460. The positioning within the rotary stage system of encoder heads 430 and 435 as well as encoder ring 460 in the present example is optimal for angular positioning accuracy and runout performance.

Rotational unit 440 includes rotational air bearing 450. In some examples, rotational air bearing 450 is a vacuum preloaded air bearing. Rotational unit 440 can precisely rotate about a z-axis using rotational air bearing 450. In order to supply pressurized air to rotational air bearing 450, air bushing 465 is mounted to translational frame 405 and includes at least one port through which pressurized air can be supplied to rotational air bearing 450. Air bushing 465 is a cylindrical air bearing that fits around rotational until 440. The ports of air bushing 465 each line up with an aperture of rotational unit 440, via which the pressure is supplied to rotational air bearing 450.

Figure 5:
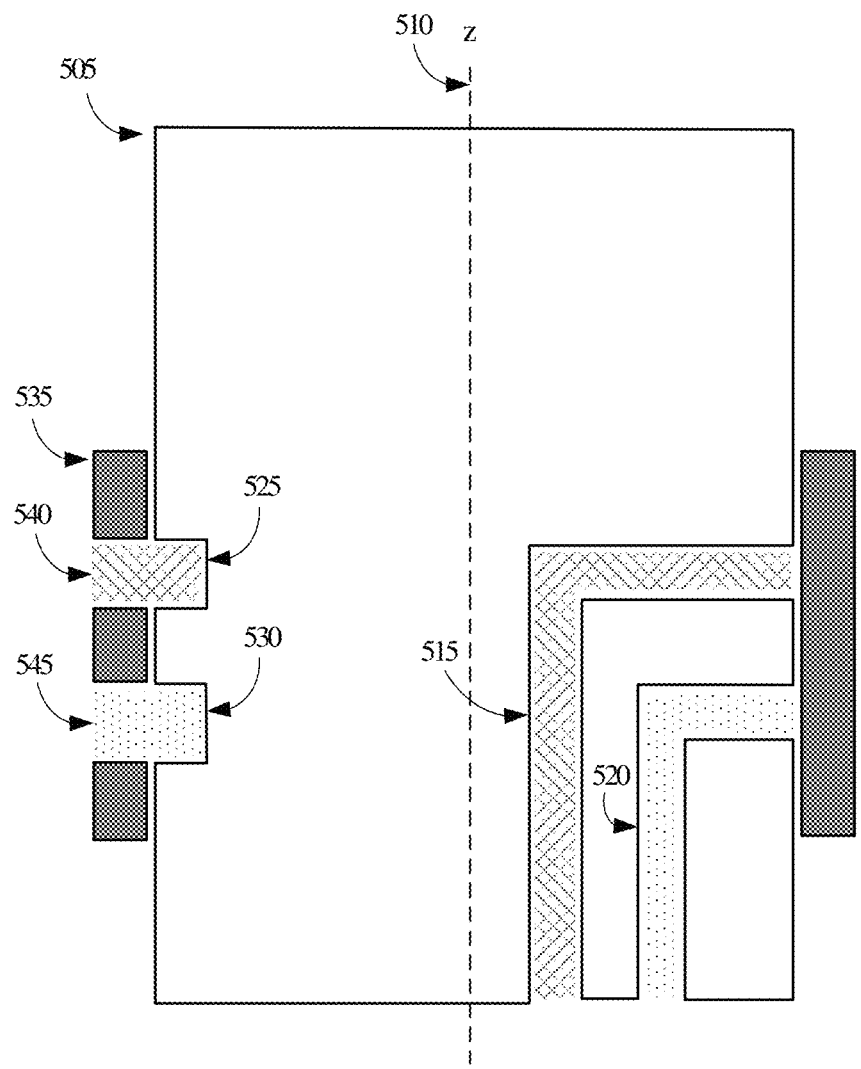
FIG. 5 illustrates an exemplary embodiment of a rotary shaft in accordance with some embodiments of the present invention.

FIG. 5 illustrates an example of a pneumatic rotary unit in accordance with some embodiments of the present technology. Rotary shaft 505 rotates about axis 510 and is located within air bushing 535. Rotary shaft 505 includes aperture 515, aperture 520, groove 525, and groove 530. Air bushing 535 comprises port 540 and port 545. A first pressure is depicted as being supplied by port 540 and a second pressure is depicted as being supplied by port 545. In some examples, the first pressure is a positive pressure and the second pressure is a negative pressure (i.e., less than atmospheric pressure). Alternatively, both the first pressure and the second pressure may be positive pressures. If port 540 and port 545 both supply positive pressures, the second positive pressure may be used in a vacuum generator located within the rotary shaft. The vacuum generator may then use the second positive pressure to generate vacuum in the rotary shaft. In yet another scenario, rotary shaft 505 may comprise only a single port, wherein the single port provides positive pressure to a rotary air bearing.

Rotary shaft 505 may be located within one of the rotary stages of the previous examples, or rotary shaft 505 may be used in an alternative setting that requires the supply of pressure to a pneumatic rotary unit without contact.

Air bushing 535 is an air bearing that fits around the outer perimeter of rotary shaft 505. There is an air gap between air bushing 535 and rotary shaft 505. Air bushing 535 has an inner layer of porous media that supplies high pressure to fill the air gap between air bushing 535 and rotary shaft 505. Air bushing 535 has multiple pressurized surfaces that ride on rotary shaft 505. Due to the porous media of these surfaces, they can only supply a certain amount of flow, causing them to serve as a flow restrictor. Thus, these air bearing surfaces of air bushing 535 act as a seal and flow restrictor, limiting the escape of pressure. In this way, pressure can be supplied from each of the ports into their respective grooves. For example, port 540 supplies high pressure to groove 525, and the pressure does not escape in the gap between air bushing 535 and rotary shaft 505 because it is already high-pressure on both sides. Similarly, port 545 can supply vacuum to groove 530 as long as there is sufficient evacuation flow to exhaust the restricted pressure leakage.

Groove 525 includes an opening to aperture 515 and because the groove continues three hundred and sixty degrees around rotary shaft 505, it can continue to feed pressure through the aperture at any angular position. Groove 530 includes an opening to aperture 520 and because the groove also continues three hundred and sixty degrees around rotary shaft 505, it can continue to feed pressure through aperture 520. In some examples, apertures 515 and 520 deliver pressure to a rotary air bearing, or a rotary VPL air bearing.

Although demonstrated as being cut into rotary shaft 505 in the present example, grooves 525 and 530 are optional. In some embodiments, rotary shaft 505 may not include grooves at all. Furthermore, grooves may be cut into the air bushing instead of rotary shaft 505, creating a three hundred and sixty degree space in which a pressure can be fed to an aperture of rotary shaft 505. In some embodiments, grooves may not be necessary in either component if enough pressure can be supplied to the apertures through the space between air bushing 535 and rotary shaft 505.

Figure 6:
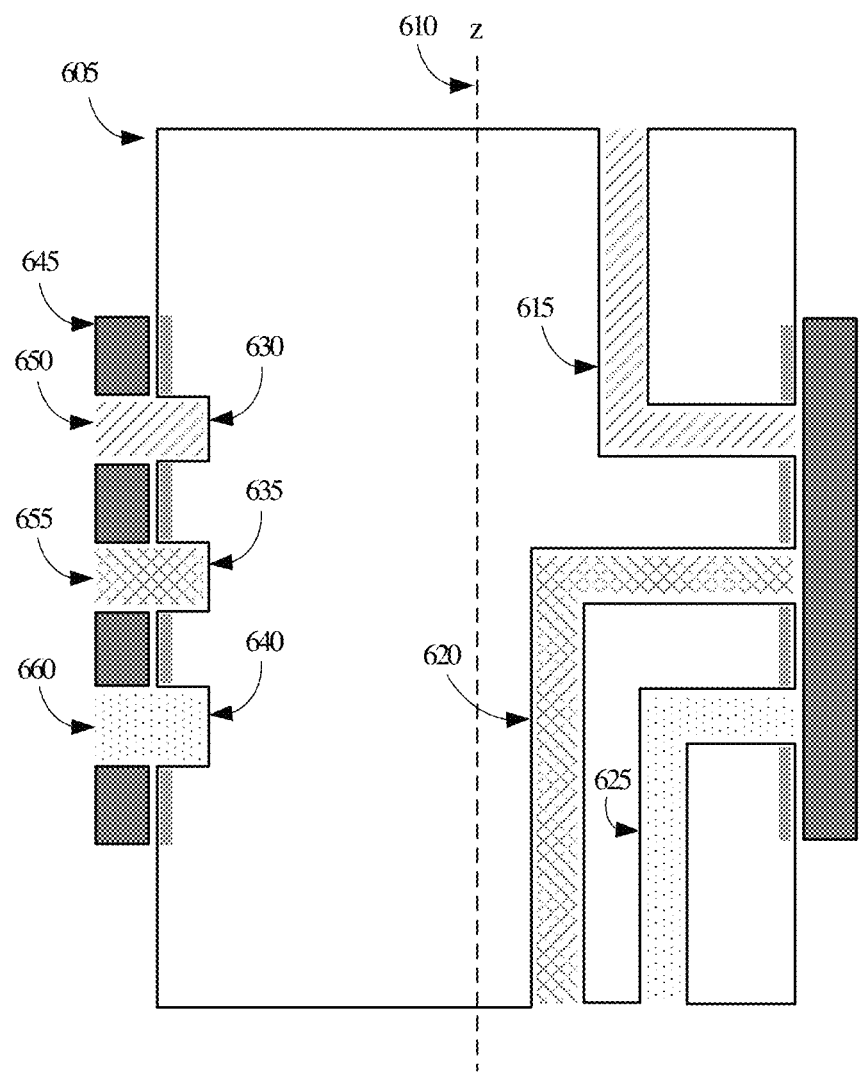
FIG. 6 illustrates an exemplary embodiment of a rotary shaft in accordance with some embodiments of the present invention.

FIG. 6 illustrates an alternative example of a rotary shaft in accordance with some embodiments of the present technology. Rotary shaft 605, contrary to rotary shaft 505, includes three grooves and three apertures. Air bushing 645 also includes an additional port for supplying pneumatic air to the additional groove and aperture. Rotary shaft 605 rotates about axis 610 while air bushing 645 remains stationary. Air bushing 645 and rotary shaft 605 are non-contact. In some examples, rotary shaft 605 rotates entirely non-contact with any other parts. For example, rotary shaft 605 may supply the pneumatic air via apertures 620 and 625 to a rotational air bearing that provides vertical support for the rotary unit to rotate above a surface without contact. Furthermore, rotary unit 605 may be horizontally stabilized with at least one air bearing. By not requiring a physical connection to rotary shaft 605, the rotary shaft is capable of rotating three hundred and sixty degrees continuously, i.e., when it reaches three hundred and sixty degrees of rotation, it can continue to rotate in the same direction as many times as necessary. Previous technology would require connective components which restrict how far a rotary shaft can rotate or mechanical seals that add significant amounts of friction.

In order to supply pneumatic air to each of aperture 615, aperture 620, and aperture 625 without air bushing 645 contacting rotary shaft 605 and without physical connective components between them, air bushing 645 supplies high pressure air through its inner surface. Air bushing 645 uses the high-pressure air like an air bearing to create an air gap between its inner surface and rotary shaft 605. The porous media of the inner surface of air bushing 645 acts as a flow restrictor. Thus, when enough pressure is supplied through the air bearing surface around each of ports 650, 655, and 660, positive or negative pressures can be supplied from each of the ports into each of the grooves and therefore into each of the apertures without loss of pressure between air bushing 645 and rotary shaft 605. The air bearing pressure around each of the ports thus creates an air barrier, sealing the pneumatic supply to travel directly from the air bushing port to its respective groove and aperture.

For example, port 650 supplies pneumatic air to aperture 615 via groove 630. In order for the pneumatic supply to travel from port 650 into groove 630 and remain in groove 630 as it is fed to aperture 615, the inner wall of air bushing 645 provides an air barrier around port 650 that fills the air gap between air bushing 645 and rotary shaft 605. Enough pressure is supplied to the air gap that the flow is restricted and the pneumatic air cannot escape through the air barrier.

The pneumatic air supplied by port 650 may be vacuum pressure in some scenarios. Aperture 615 may provide the vacuum pressure to the mounting surface of rotary shaft 605, which can be utilized for various mounting techniques. In other embodiments, more than one pressure may be supplied to the mounting surface of the rotary shaft. In addition to the present example, two ports, three ports, and more than three ports are anticipated by the present example.

The other apertures, aperture 620 and aperture 625, are supplied pneumatic air by ports 655 and 660, respectively. In the same manner, the inner surface of air bushing 645 creates enough pressure within the air gap that flow is restricted, allowing pneumatic air to be supplied without physical contact. In some embodiments, port 655 supplies positive pressure to aperture 620 and port 660 supplies vacuum to aperture 625. In other embodiments, port 655 provides vacuum to aperture 620 and port 660 provides positive pressure to aperture 625. In additional embodiments, ports 655 and 660 may both provide positive or negative pressure, or there may be only a single port that provides pneumatic air to a single aperture. Alternatively, both the first pressure and the second pressure may be positive pressures. If port 540 and port 545 both supply positive pressures, the second positive pressure may be used in a vacuum generator located within the rotary shaft. The vacuum generator may then use the second positive pressure to generate vacuum in the rotary shaft. In yet another scenario, rotary shaft 505 may comprise only a single port, wherein the single port provides positive pressure to a rotary air bearing.

In the present example, aperture 615, aperture 620, and aperture 625 are formed from two cross-drilled holes having similar diameters. However, in other examples the apertures may take on different embodiments such as having different diameters, varying diameters, or, instead of cross drilled holes, may take a different path such as a curved path, a straight path, and similar paths capable of porting pneumatic air through rotary shaft 605. In some examples, ports 650, 655, and 660 have a diameter of equal size or a smaller size than the width of grooves 630, 635, and 640, respectively. Additionally, apertures 615, 620, and 625 may have diameters of the same size or a smaller size than the width of grooves 630, 635, and 640, respectively.

Figure 7:
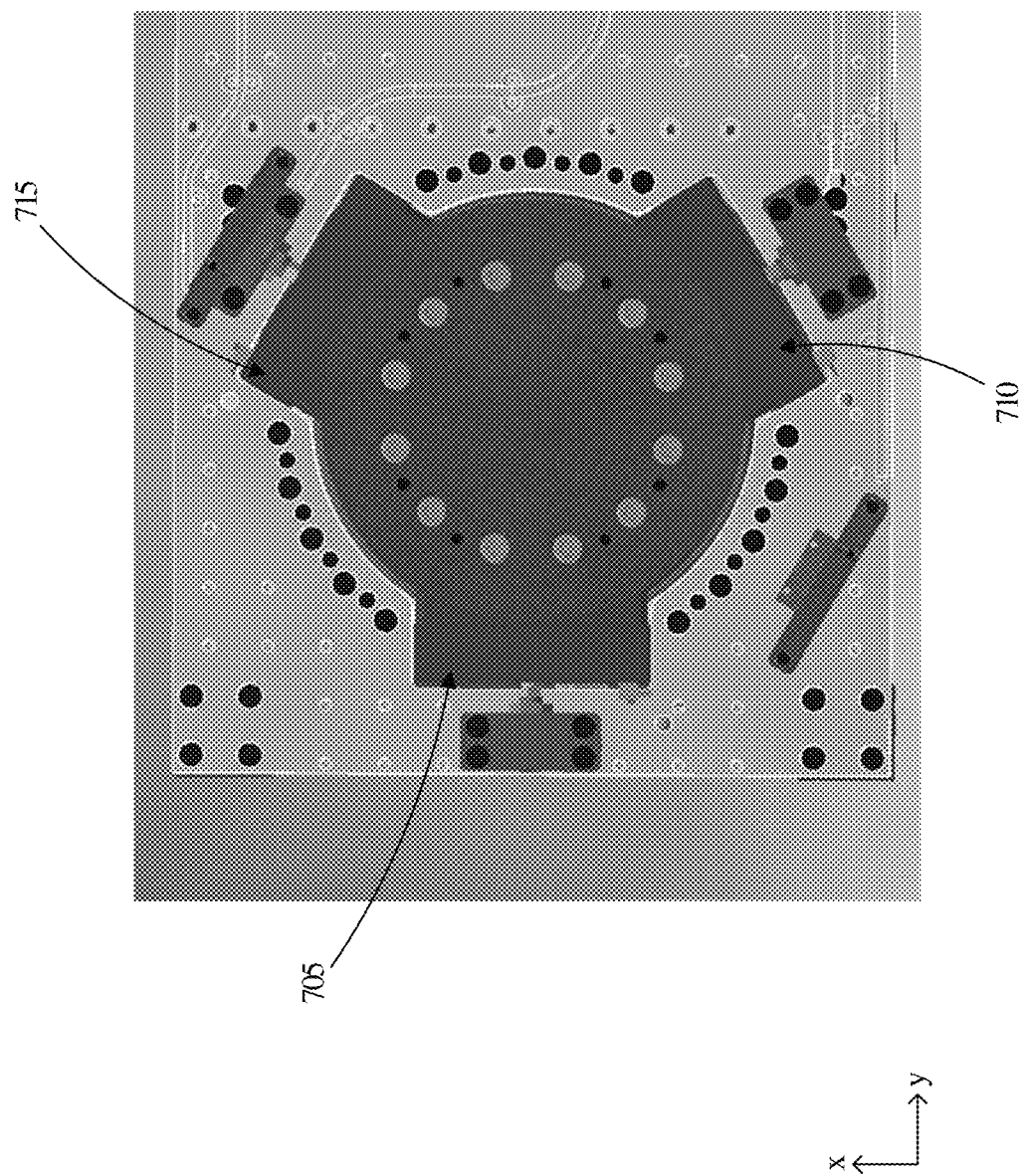
FIG. 7 illustrates a top-down view of a rotary stage in accordance with some embodiments of the present invention.

FIG. 7 illustrates an example of a rotary stage, as viewed from above, in accordance with some embodiments of the present technology. FIG. 7 shows a top-view, wherein three radial air bearings, radial air bearing 705, radial air bearing 710, and radial air bearing 715 and their relative positions are illustrated. In the present example, the three radial air bearings are used to stabilize the rotary shaft in the x-y plane. The three radial air bearings are kinematically mounted on ball and socket joints, enabling them to adjust such that the rotary shaft is constrained properly. Alternative examples may use fewer air bearings or more air bearings to horizontally stabilize the rotary shaft may be used and are anticipated herein.

It should be emphasized that the above-described embodiments are merely possible examples of implementations, merely set forth for a clear understanding of the principles of this disclosure. Many variations and modifications may be made to the above-described embodiments without departing substantially from the principles of the disclosure. All such modifications and variations are intended to be included herein within the scope of this disclosure.

What is claimed is:

1. A rotary stage comprising:
a base; and
a housing comprising:
at least one radial air bearing that maintains stability of a rotary shaft in an x direction and a y direction in an x-y plane, wherein the rotary shaft comprises a rotary air bearing that is directly above the base; and
an air bushing comprising:
a first port that provides a first pressure to a first aperture of the rotary shaft; and
a second port that provides a second pressure to a second aperture of the rotary shaft.

2. The rotary stage of claim 1, further comprising the rotary shaft, wherein the rotary shaft can rotate about a z-axis three hundred and sixty degrees continuously and is non-contact with the base and the housing.

3. The rotary stage of claim 1, wherein the rotary air bearing is a vacuum preloaded (VPL) air bearing.

4. The rotary stage of claim 1, wherein:
the first pressure is a positive pressure;
the second pressure is a negative pressure;
the first pressure is provided to the rotary air bearing through the first aperture of the rotary shaft and floats the rotary shaft above the base; and
the second pressure is provided to the rotary air bearing through the second aperture of the rotary shaft and holds the rotary shaft down to the base.

5. The rotary stage of claim 1, wherein the air bushing further comprises a third port that provides a pressure to a third aperture of the rotary shaft and the third aperture provides the pressure to a mounting surface of the rotary shaft.

6. The rotary stage of claim 1 wherein:
the first aperture of the rotary shaft is located within a first groove of the rotary shaft;
the second aperture of the rotary shaft is located within a second groove of the rotary shaft; and
the air bushing provides a first air seal for the first pressure provided to the first aperture by the first port and a second air seal for the second pressure provided to the second aperture by the second port.

7. The rotary stage of claim 1, further comprising:
an encoder feedback ring coupled to the rotary shaft;
an optical encoder coupled to the housing; and
a motor stator capable of rotating the rotary shaft, wherein the rotary shaft comprises a magnetic ring.

8. The rotary stage of claim 1, wherein the housing further comprises at least one bearing for translation of the housing in the x direction and the y direction in the x-y plane.

9. A system comprising:
a rotary air bearing that rotates about a vertical axis, the rotary air bearing comprising:
a first aperture that receives a first pressure; and
a second aperture that receives a second pressure; and
a non-rotary air bearing comprising:
a first port that provides the first pressure to the first aperture of the rotary air bearing; and
a second port that provides the second pressure to the second aperture of the rotary air bearing.

10. The system of claim 9, further comprising a housing, wherein the housing is coupled to the non-rotary air bearing and the rotary air bearing rotates without contact with the housing.

11. The system of claim 10, wherein:
the first pressure is a positive pressure and floats the rotary air bearing above a bottom surface of the housing; and the second pressure is a vacuum pressure that holds the rotary air bearing down towards the bottom surface of the housing.

12. The system of claim 10, wherein the housing comprises:
   at least one radial air bearing configured to kinematically constrain the rotary air bearing in an x-y plane without contacting the rotary air bearing;
   a non-contact encoder that uses an encoder feedback ring associated with the rotary air bearing to determine an angular position of the rotary air bearing, wherein the non-contact encoder is not in contact with the encoder feedback ring; and
   a motor stator configured to interface with a magnetic ring in the rotary air bearing to rotate the rotary air bearing.

13. The system of claim 9, further comprising a rotary shaft coupled to the rotary air bearing, wherein the rotary shaft comprises:
   a first aperture of the rotary shaft for providing the first pressure from the first port of the non-rotary air bearing to the rotary air bearing;
   a second aperture of the rotary shaft for providing the second pressure from the second port of the non-rotary air bearing to the rotary air bearing;
   a first groove around a circumference of the rotary shaft, wherein the first groove comprises the first aperture of the rotary shaft; and
   a second groove around the circumference of the rotary shaft, wherein the second groove comprises the second aperture of the rotary shaft.

14. The system of claim 9, wherein the rotary air bearing is a vacuum preloaded air bearing.

15. A method comprising:
   in at least one radial air bearing, maintaining horizontal stability of a rotary unit without contacting the rotary unit; and
   in an air bushing:
      providing a first pressure to a first aperture of the rotary unit without a physical connection between the air bushing and the rotary unit; and
      providing a second pressure to a second aperture of the rotary unit without a physical connection between the air bushing and the rotary unit.

16. The method of claim 15, further comprising:
   floating the rotary unit above a surface using the first pressure provided to the first aperture of the rotary unit, wherein the first pressure is a positive pressure; and
   holding the rotary unit directly above the surface using the second pressure provided to the second aperture of the rotary unit, wherein the second pressure is a negative pressure.

17. The method of claim 15, wherein the rotary unit can rotate three hundred and sixty degrees continuously without touching any other components.

18. The method of claim 15, wherein the rotary unit is a vacuum preloaded air bearing.

19. A system comprising:
   a means for providing a positive pressure to a first aperture of a rotary unit without contacting the rotary unit;
   a means for providing a vacuum pressure to a second aperture of the rotary unit without contacting the rotary unit;
   a means for maintaining a horizontal stability of the rotary unit without contacting the rotary unit; and
   a means for maintaining a vertical stability of the rotary unit without contacting the rotary unit.

20. The system of claim 19, further comprising:
   a means for holding a bottom of the rotary unit directly above a surface using both the positive pressure and the vacuum pressure provided to the first and second apertures of the rotary unit;
   a means for determining an angular position of the rotary unit without contacting the rotary unit;
   a means for rotating the rotary unit; and
   a means for translating the rotary unit in an x-y plane without contacting the rotary unit.

* * * * *